United States Patent
Krishnamurthy et al.

(10) Patent No.: US 9,886,501 B2
(45) Date of Patent: Feb. 6, 2018

(54) CONTEXTUAL CONTENT GRAPH FOR AUTOMATIC, UNSUPERVISED SUMMARIZATION OF CONTENT

(71) Applicant: International Business Machines Corporation, Armonk, NY (US)

(72) Inventors: Lakshminarayanan Krishnamurthy, Round Rock, TX (US); Niyati Parameswaran, Santa Clara, CA (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/186,843

(22) Filed: Jun. 20, 2016

(65) Prior Publication Data
US 2017/0364586 A1 Dec. 21, 2017

(51) Int. Cl.
G06F 17/27 (2006.01)
G06F 17/30 (2006.01)

(52) U.S. Cl.
CPC ...... *G06F 17/30719* (2013.01); *G06F 17/274* (2013.01); *G06F 17/2775* (2013.01); *G06F 17/30619* (2013.01); *G06F 17/30654* (2013.01); *G06F 17/30731* (2013.01)

(58) Field of Classification Search
CPC .................................................... G06F 17/02
USPC ............................ 704/1, 9, 10, 257, 270–275
See application file for complete search history.

(56) References Cited

U.S. PATENT DOCUMENTS

| | | | |
|---|---|---|---|
| 6,185,592 B1 * | 2/2001 | Boguraev | G06F 17/2745 704/9 |
| 7,366,711 B1 | 4/2008 | McKeown et al. | |
| 7,809,548 B2 | 10/2010 | Mihalcea et al. | |
| 9,037,590 B2 | 5/2015 | Kumar et al. | |
| 9,633,005 B2 * | 4/2017 | Danielyan | G06F 17/271 |
| 2010/0287162 A1 | 11/2010 | Shirwadkar | |

(Continued)

OTHER PUBLICATIONS

Das et al. "Opinion Summarization in Bengali: A Theme Network Model". Proceedings of the 2nd IEEE International Conference on Privacy, Security, Risk, and Trust, Aug. 20-22, 2010, Minneapolis, USA, p. 675-682.*
Yeh J. Y. et al., iSpreadRank: Ranking sentences for extraction-based summarization using feature weight propagation in the sentence similarity network, Expert Systems with Applications, 35(3), 1451-1462, 2008.
Pawar D. D. et al., Context Based Indexing in Text Summarization Using Lexical Association, International Journal of Engineering Research and Technology, vol. 2, No. 12, Dec. 2013.
Jagadeesh J. et al., Sentence Extraction Based Single Document Summarization, http://citeseerx.ist.psu.edu/viewdoc/download?doi=10.1.1.471.412&rep=rep1&type=pdf, 2005.

(Continued)

Primary Examiner — Jesse Pullias
(74) Attorney, Agent, or Firm — Terrile, Cannatti, Chambers & Holland, LLP; Stephen A. Terrile

(57) ABSTRACT

A method, system and computer-usable medium are disclosed for using a contextual graph to summarize a corpus of content. Natural Language Processing (NLP) preprocessing operations are performed on text within an input corpus to form a grammatical analysis. In turn, the grammatical analysis is used to generate semantic associations between phrases in the input corpus. The resulting semantic associations are then used to determine the thematic relevance of the individual sentences in the input corpus to form a context-based ranking. In turn, the context-based ranking is used to construct a context graph, the vertices of which are represented by phrases, and the edges are represented by an aggregate score resulting from performing calculations associated with semantic similarity of the phrases. The resulting context graph is then used to generate a content summarization for the input corpus.

20 Claims, 4 Drawing Sheets

(56) References Cited

U.S. PATENT DOCUMENTS

| | | | |
|---|---|---|---|
| 2011/0257963 A1* | 10/2011 | Zuev | G06F 17/2775 |
| | | | 704/9 |
| 2012/0197630 A1 | 8/2012 | Lyons et al. | |
| 2012/0303357 A1 | 11/2012 | Yasin | |
| 2015/0106157 A1 | 4/2015 | Chang et al. | |
| 2015/0112664 A1* | 4/2015 | Srinivasan | G06F 17/2785 |
| | | | 704/9 |

OTHER PUBLICATIONS

Pourvali M. et al., Automated Text Summarization Base on Lexicales Chain and graph Using of WordNet and Wikipedia Knowledge Base, http://arxiv.org/ftp/arxiv/papers/1203/1203.3586.pdf, 2012.

High, R., The Era of Cognitive Systems: An Inside Look at IBM Watson and How it Works, IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Simplenlg, Java API for Natural Language Generation, https://github.com/simplenlg/simplenlg, printed Jun. 15, 2016.

* cited by examiner

CONTEXTUAL CONTENT GRAPH FOR AUTOMATIC, UNSUPERVISED SUMMARIZATION OF CONTENT

BACKGROUND OF THE INVENTION

Field of the Invention

The present invention relates in general to the field of computers and similar technologies, and in particular to software utilized in this field. Still more particularly, it relates to a method, system and computer-usable medium for using a contextual graph to summarize a corpus of content.

Description of the Related Art

The volume of information available for consumption continues to grow at an unprecedented pace, which has led to a corresponding increase in information overload. One approach to this issue is automatic data summarization, which typically provides a summary of the key elements of an input corpus of content, such as human-readable text. However, automatic data summarization is not limited to text, as various approaches may also be used to summarize collections of images, video content, audio content, or any combination thereof. The primary goal of such summarizations is to find a representative subset of the input content that contains relevant information of the entire set.

In general, there are two common approaches to automated summarization: extraction and abstraction. Extractive approaches typically select a subset of existing words, phrases, or sentences in an original corpus of text to create a summary. In contrast, abstractive approaches build an internal semantic representation and then use various natural language processing (NLP) techniques to create a summary that is similar to what a human might generate. In certain cases, such summaries might contain words not explicitly present in the original text.

These various approaches typically take into account variables such as the length, writing style, and syntax of an input corpus. Additionally, certain approaches utilize graph-based algorithms to calculate the importance of sentences within a body of text, as well as static features such as term frequency, term length, and term position to establish scoring relevance of individual sentences. However, dependence upon static features may result in the document indexing weight failing to reflect the context with which various document terms are used. As a result, the indexing methods used in such approaches are unable to distinguish between various terms that are scored through the assignment of sentence similarity values, and by extension, may affect the accuracy of the resulting summary.

SUMMARY OF THE INVENTION

In certain embodiments, the disclosure relates to a computer-implemented method for using a contextual graph to summarize a corpus of content, comprising: receiving an input corpus; applying natural language processing (NLP) to the input corpus to form a grammatical analysis; using the grammatical analysis to generate semantic associations between phrases in the input corpus, using the semantic associations to determine the thematic relevance of sentences in the input corpus to form a context-based ranking; using the context-based ranking to construct a context graph for the phrases; and using the context graph to generate a content summarization of the input corpus.

In certain embodiments, the disclosure relates to a system comprising: a processor; a data bus coupled to the processor; and a computer-usable medium embodying computer program code, the computer-usable medium being coupled to the data bus, the computer program code used for using a contextual graph to summarize a corpus of content and comprising instructions executable by the processor and configured for: receiving an input corpus; applying natural language processing (NLP) to the input corpus to form a grammatical analysis; using the grammatical analysis to generate semantic associations between phrases in the input corpus, using the semantic associations to determine the thematic relevance of sentences in the input corpus to form a context-based ranking; using the context-based ranking to construct a context graph for the phrases; and using the context graph to generate a content summarization of the input corpus.

In certain embodiments, the disclosure relates to a non-transitory, computer-readable storage medium embodying computer program code, the computer program code comprising computer executable instructions configured for: receiving an input corpus; applying natural language processing (NLP) to the input corpus to form a grammatical analysis; using the grammatical analysis to generate semantic associations between phrases in the input corpus, using the semantic associations to determine the thematic relevance of sentences in the input corpus to form a context-based ranking; using the context-based ranking to construct a context graph for the phrases; and using the context graph to generate a content summarization of the input corpus.

In certain embodiments, the method, system and computer readable medium may include one or more of the following aspects. More specifically, in certain embodiments, the context graph uses nodes to represent the phrases and edges to represent aggregated scores based on a calculation of structural and semantic similarity of the phrases. In certain embodiments, the operation further includes identifying at least one theme of the input corpus; and using contextual phrasal vectors between the phrases, ranked by the at least one theme to determine the context-based ranking. In certain embodiments, the operation further includes identifying concepts and topics referenced in the phrases to determine a thematic relevance of sentences in the input corpus. In certain embodiments, the operation further includes ranking sentences based on the context-based ranking to form a sentencing ordering. In certain embodiments, the ranking comprises performing a text ranking operation, the text ranking operation exploiting a source text structure to identify key phrases. In certain embodiments, the operation further includes creating a stochastic matrix against vertices in the context graph to determine a ranking of the sentences. In certain embodiments, the operation further includes combining the stochastic matrix with a damping factor to determine an order in which individual sentences within the input corpus are ranked. Some or all of these aspects enables establishment of a context for various text passages which advantageously results in a contextually-relevant summarization of an input corpus

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
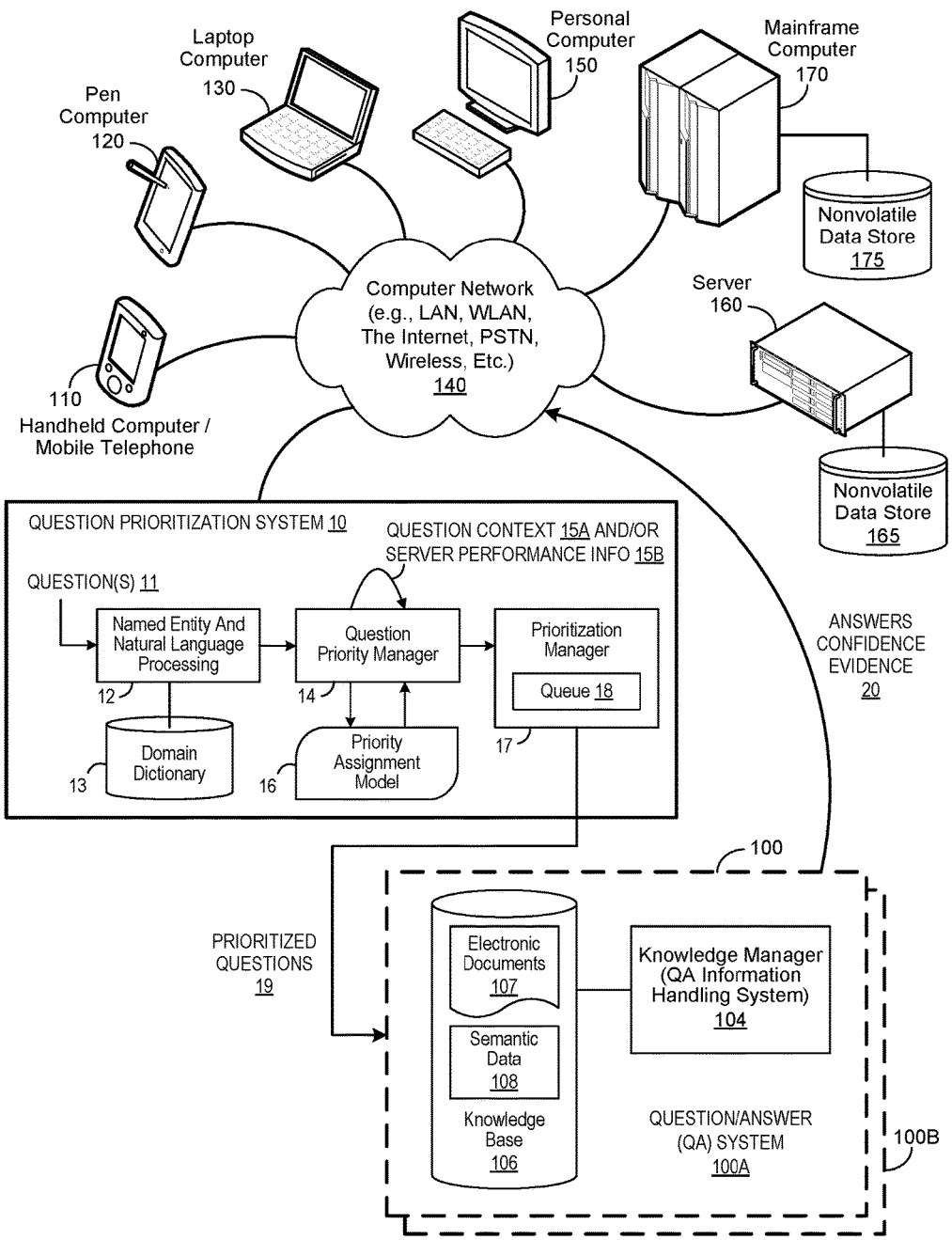
FIG. 1 depicts an exemplary client computer in which the present invention may be implemented.

A method, system and computer-usable medium are disclosed for using a contextual graph to summarize a corpus of content. In various embodiments, a series of Natural Language Processing (NLP) preprocessing operations are performed on text within an input corpus to generate meaningful tokenized words, which are then used to generate a grammatical analysis. In turn, the grammatical analysis is used to determine the thematic relevance of individual sentences within the input corpus. In certain embodiments, contextualized phrasal vectors are generated, which are then used to generate semantic associations that assist in establishing relationships between individual words within the input corpus.

Individual words within the input corpus, and their corresponding semantic associations, are then used to construct a contextualized content graph. In various embodiments, the vertices of the contextualized content graph are represented by phrases, and the edges are represented by an aggregate score resulting from performing calculations associated with semantic similarity of the phrases. A stochastic matrix is then created and combined with a damping factor to determine the order in which individual sentences within the input corpus are ranked. A content summarization is then generated by combining the top ranking sentences, using a threshold or length cutoff to limit the size of the summary.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's Web Sphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
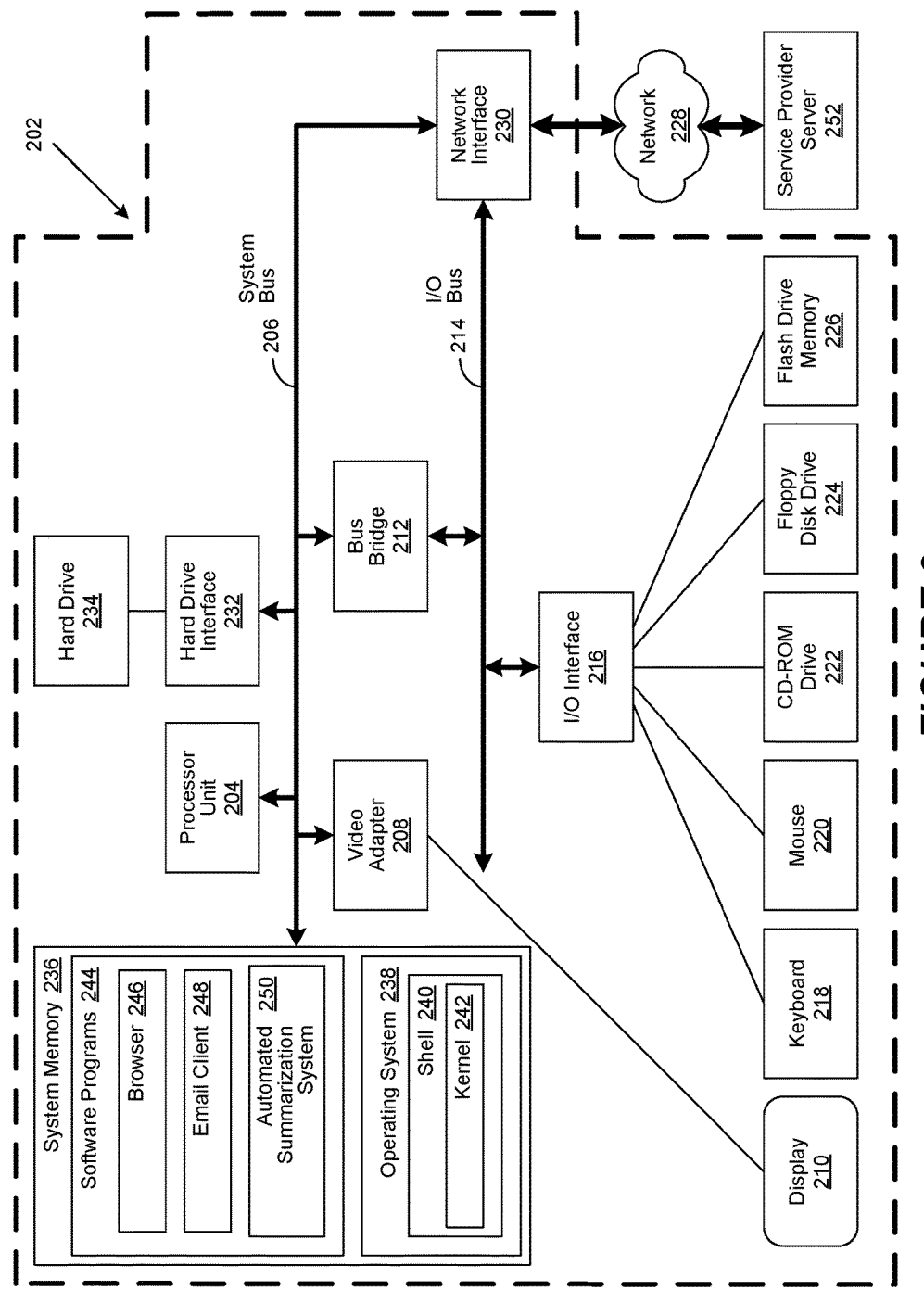
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include an automated summarization system 250. In these and other embodiments, the automated summarization system 250 includes code for implementing the processes described hereinbelow. In one embodiment, the information processing system 202 is able to download the automated summarization system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
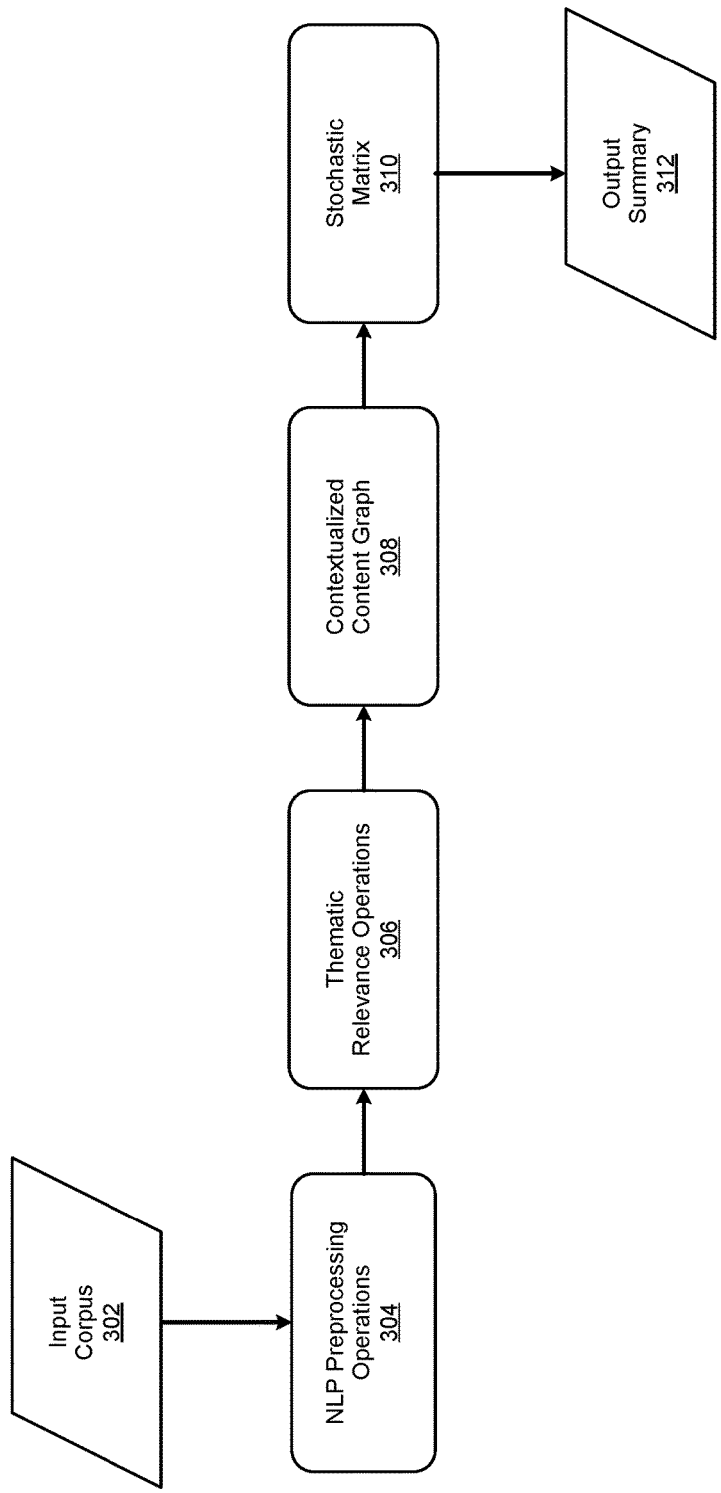
FIG. 3 is a generalized block diagram showing the operation of an automated summarization system.

FIG. 3 is a generalized block diagram showing the operation of an automated summarization system implemented in accordance with an embodiment of the invention. As used herein, automated summarization broadly refers to performing automated content reducing operations on an input corpus 302 of content to generate an output summary 312 that retains the content's most salient points. For the purposes of this disclosure, a corpus may be defined as content, be it structured or unstructured, which is stored electronically in a manner that allows the content to be processed via an information processing system. Skilled practitioners of the art will be familiar with various approaches to automated summarization that can be used to summarize a variety of content, including text (e.g., a document), images, video, audio, or any combination thereof. For example, text summarization typically attempts to automatically create a representative summary, or abstract, of the entire document by finding the most informative sentences. Likewise, image summarization attempts to identify the most representative, or salient, images within a collection. Video and audio summarization is likewise used to remove unimportant or repetitive scenes or sound passages with the intent of providing a distilled and concise version that captures the essence of the original content. One practical example of video summarization is its use with surveillance videos, where only important events in the recorded video are extracted, as much of the video may be uninteresting with nothing of importance occurring.

In general, there are two common approaches to automated summarization: extraction and abstraction. In extractive approaches, objects are automatically extracted from a corpus of content without modifying the objects themselves. Examples of such approaches include keyphrase extraction, where individual words or phrases are selected to "tag" a document, and document summarization, where whole sentences are extracted, without modification, to create a short paragraph summary. Likewise, in image, video and audio summarization, subsets of the content are extracted without modifying the extracted content itself. In contrast, abstractive approaches first build an internal semantic representation of a source corpus and then use various natural language processing (NLP) processes familiar to those of skill in the art to create a summary that is similar to what a human might generate. These approaches, which paraphrase sections of the source corpus of content, typically condense a text, or other content, more strongly than their extractive counterparts and may contain content not explicitly present in the source corpus.

Those of skill in the art will likewise be aware that automated summarization is commonly associated with various aspects of information retrieval, machine learning and data mining. As used herein, machine learning broadly refers to the use of algorithms to learn from, and make predictions on, data. In various machine language approaches, such machine learning algorithms operate by building a model from example inputs, which in turn is used to make data-driven decisions and predictions.

There are two common approaches to machine learning: supervised and unsupervised. In supervised machine learning approaches, an example of each n-gram is identified within a source corpus of human-readable text. As used herein, an n-gram broadly refers to a contiguous sequence of n items from a particular sequence of text. The items may be phonemes, syllables, letters, words, or base pairs and are typically collected from an input corpus 302 of text. When the items are words, n-grams may also be referred to as shingles. An n-gram of size 1 is referred to as a "unigram," size 2 as a "bigram," size 3 as a "trigram," and so forth.

The resulting n-gram examples are then processed to identify their associated descriptive features. As an example, a phrase beginning with an upper-case letter may signify the beginning of a sentence or possibly the name of a person, place or thing. Assuming there are known keyphrases available for use within a training corpus, positive or negative labels can be assigned to the various examples. In turn, these labels can be used by a classifier implemented to discriminate between positive and negative examples as a function of various features. Those of skill in the art will be aware that certain classifiers make binary classifications for text examples, while others assign a probability value to a given example.

While supervised approaches to machine learning have certain advantages, such as being able to produce interpretable rules for which features characterize a keyphrase, they also require significant volumes of training data to be effective. For example, a training corpus containing many documents with known keyphrases may be needed. Furthermore, training a machine learning system on a particular domain tends to customize the extraction process to that domain. Consequently, the trained classifier may not be portable to other domains.

In contrast, unsupervised keyphrase extraction approaches do not use training data to learn explicit features that characterize keyphrases. For example, the TextRank algorithm is commonly implemented in unsupervised approaches to exploit the structure of a source text to identify keyphrases that appear "central" to the text in much the same way that PageRank ranks the importance of various Web pages. Skilled practitioners of the art will be familiar with TextRank, which is a general purpose, graph-based ranking algorithm for natural language processing (NLP). Consequently, TextRank does not rely on previous training data. Instead, it can be run on any given corpus of text and produce output simply based upon the text's intrinsic properties. As a result, the TextRank algorithm is easily portable to new domains and languages.

In various unsupervised learning approaches, TextRank is run on a graph designed for a particular NLP task. As an example, a graph may be built for keyphrase extraction where a particular set of text units are used for vertices and the edges are based upon a measure of semantic or lexical similarity between each of the vertices. The measure of the semantic or lexical similarity between each of the vertices represents an aggregated score for a particular edge. Unlike PageRank, these edges are typically undirected and may be weighted to reflect a degree of similarity. Once constructed, the graph is used to form a stochastic matrix, combined with a damping factor, such as in the "random surfer model," which refers to a model where a user gets bored after several clicks on a given webpage and decides to switch to a random page. Likewise, ranking of the vertices may be obtained by finding the eigenvector corresponding to eigenvalue 1 (i.e., the stationary distribution of the random walk on the graph).

In this example, the edges may be created based upon word co-occurrence. For example, two vertices may be connected by an edge if unigrams appear within a window of size n in the source corpus, where the value of n is typically between '2' and '10'. To further the example, the text units "chief" and "executive" may be linked in a corpus of text related to a chief executive officer (CEO). Furthermore "chief" and "officer" would also be linked because they would both appear in the same string of n words. In this example, these edges build upon the concept of "text cohesion" and the idea that words that are proximate to one another are likely related in a meaningful way. Therefore, they "recommend" each other.

Referring now to FIG. 3, an input corpus 302 of content is received for summarization. In various embodiments, the content may include text, images, video, audio, or any combination thereof. In one embodiment, the input corpus 302 contains a single document associated with a subject. In another embodiment, the input corpus 302 contains multiple documents associated with a common subject.

In this embodiment, a series of NLP preprocessing operations 304 familiar to those of skill in the art are performed on text within the input corpus 302 to generate meaningful tokenized words. As used herein, a tokenized word broadly refers to a word resulting from the performance of tokenization operations on a string of text. Skilled practitioners of the art will be familiar with tokenization, which is the process of segmenting a stream of text into words, phrases, symbols, or other meaningful elements referred to as tokens. The resulting tokens are then used as input to generate a grammatical analysis of the input corpus 302. In various embodiments, the performance of such tokenization operations provides clarity to certain grammatical aspects of words within the input corpus 302.

The grammatical analysis is the used to perform a series of thematic relevance operations 306 on each document in the input corpus 302 to determine the thematic relevance of the individual sentences they respectively contain. As used herein, thematic relevance broadly refers to the contextual relevance of a text segment, such as a phrase, to a particular theme. As used herein, context refers to taking into account parts of a statement that precede or follow a text segment to influence the meaning or effect of the text segment. As used herein contextual relevance refers to determining the relevance of a particular context or contexts with respect to a text segment. As an example, the sentence "The venerable biplane soared to dizzying heights before plummeting in a series of controlled tailspins and other aerobatics." relates to the theme of flying. In this example, the words "biplane," "soared," "tailspins," and "aerobatics" are all contextually relevant to the theme of flying and may lead to the sentence being associated with a higher thematic relevance value than the sentence "The old biplane sat unused, parked on the runway apron."

In various embodiments, contextualized phrasal vectors are generated, which are in turn used to generate semantic associations that assist in establishing relationships between individual words within the input corpus 302. As used herein, a contextualized phrasal vector broadly refers to a phrase vector that is contextually relevant to a particular theme, as described in greater detail herein. As likewise used herein, a phrase vector broadly refers to a term, defined by a given phrase, represented as a dimension in a vector space model. As likewise used herein, a semantic association refers to an association relationship which extends beyond the boundaries of the individual words of the input corpus.

In these embodiments, the value of a term (e.g., a phrase), also referred to as its term weight, in a vector is non-zero if it occurs in the input corpus 302. Accordingly, sentences in the input corpus 302 that have a higher correlation with a particular theme are automatically weighted more significantly. From the foregoing, those of skill in the art will recognize that the described approach of using contextualized phrasal vectors for term weighting will likely provide a more accurate assessment of the phrasal relevance of a given phrase than simply relying upon a term's length, frequency or position within the phrase.

Individual words within the input corpus 302, and their corresponding semantic associations, are then used in the performance of graph construction operations familiar to those of skill in the art to construct a contextualized content graph 308. For the purposes of this disclosure, a contextualized content graph may be defined as a graphical representation of a formal context where nodes of the graph represent objects of the formal context which are connected via edges in such a way that every concept extent is a connected subgraph within the contextualized content graph. For the purposes of this disclosure, a formal context may be defined as a context which is arranged according to prescribed conventions. More specifically, when performing a formal concept analysis operation, a formal context may be defined as a triple K=(G, M, I) where G is a set of objects, M is a set of attributes and I (often referred to as incidence) represents which objects possess which attributes. In various embodiments, the TextRank algorithm is implemented to construct the contextualized content graph 308. However, as opposed to current content graph construction approaches where the vertices of the graph are represented by individual words, the vertices of the contextualized content graph 308 are represented by phrases, which provide a basis for understanding their respective context. Likewise, the edges of the contextualized content graph 308 are represented by an aggregate score resulting from performing calculations associated with semantic similarity of the phrases, as opposed to being represented by word frequency, length, and position in current content graph approaches. Such representations advantageously provide summarizations which accurately reflect the context with which various document terms are used.

A stochastic matrix 310, also known as a Markov matrix, is then created and combined with a damping factor, described in greater detail herein. In various embodiments, the stochastic matrix 310 is implemented to determine the order in which individual sentences within the input corpus 302 are ranked. In these embodiments, the sentences are ranked by determining the eigenvector of their associated vertices in the contextual content graph 308, which are represented by phrases corresponding to eigenvalue 1. As a result, individual sentences in the input corpus 302 are ranked on the basis of thematic scoring, or contextual relevance, as opposed to current sentence ranking approaches using term frequency, length, and position in a document. In certain embodiments, the PageRank algorithm is used to rank the sentences. An output summary 312 is then generated by combining the top ranking sentences, using a threshold or length cutoff to limit the size of the summary. The method by which the threshold or length cutoff is determined is a matter of design choice.

In various embodiments, the input corpus 302 includes multiple documents, which are summarized in the output summary 312. Ideally, multi-document summarizations are both concise and comprehensive, incorporating various opinions and multiple perspectives within a single document. While the goal of a brief summary is to simplify information search and reference the most relevant source documents, a comprehensive multi-document summary should also contain the salient information, thereby limiting the need to access original source content.

In these embodiments, the LexRank algorithm is used in place of TextRank. Skilled practitioners of the art will be familiar with LexRank, which is essentially identical to TextRank. Despite being developed independently, both algorithms use random walks and eigenvector centrality for document summarization. While LexRank is more oriented towards summarization, it is equally useful for keyphrase extraction and other NLP ranking operations. Those of skill in the art will recognize that the implementation of LexRank provides additional value by not only automatically citing individual documents within the input corpus 302, but ranking the most relevant documents and the sentences they contain. As a result, the most contextually-relevant documents would be summarized in the output summary 312.

In various embodiments, heuristic post-processing is implemented to not only present sentences in a ranked order, but to also discard sentences that are too similar to those already present in the output summary 312. In certain embodiments, the heuristic post-processing is performed through the implementation of cross-sentence information subsumption. Otherwise, the algorithm would assume that similar sentences have a greater importance as importance also stems from the number of other sentences recommending it. Accordingly, performance of the post-processing heuristic operations helps ensure that a distinct collection of sentences are rendered when the output summary 312 is being generated, as opposed to multiple rewordings of various sentences saying the same thing. Those of skill in the art will also recognize that the tradeoff between exploitation (i.e., sentences that have high recommendation value) and exploration (i.e., sentences that embody a distinctive theme within the document) result in the generation of summaries that are not only contextually relevant, but lexically diverse as well.

From the foregoing, those of skill in the art will recognize that the invention does not solely rely upon document features such as term frequency, length and position within a document to assign indexing weights to the words it contains. Instead, the contextualized content graph implemented in various embodiments establishes context for various text passages, which advantageously results in a contextually-relevant summarization of an input corpus 302. Furthermore, these embodiments advantageously provide an automated summarization that is portable across domains. Moreover, certain of these embodiments address and advantageously overcome the issues of synonymy and polysemy typically associated with large volumes of data. Accordingly, aspects of the present disclosure enable concept summarization where there is a reduced dependence upon term significance when building an index as a greater emphasis is placed upon the context of terms within an input corpus 302.

Figure 4:
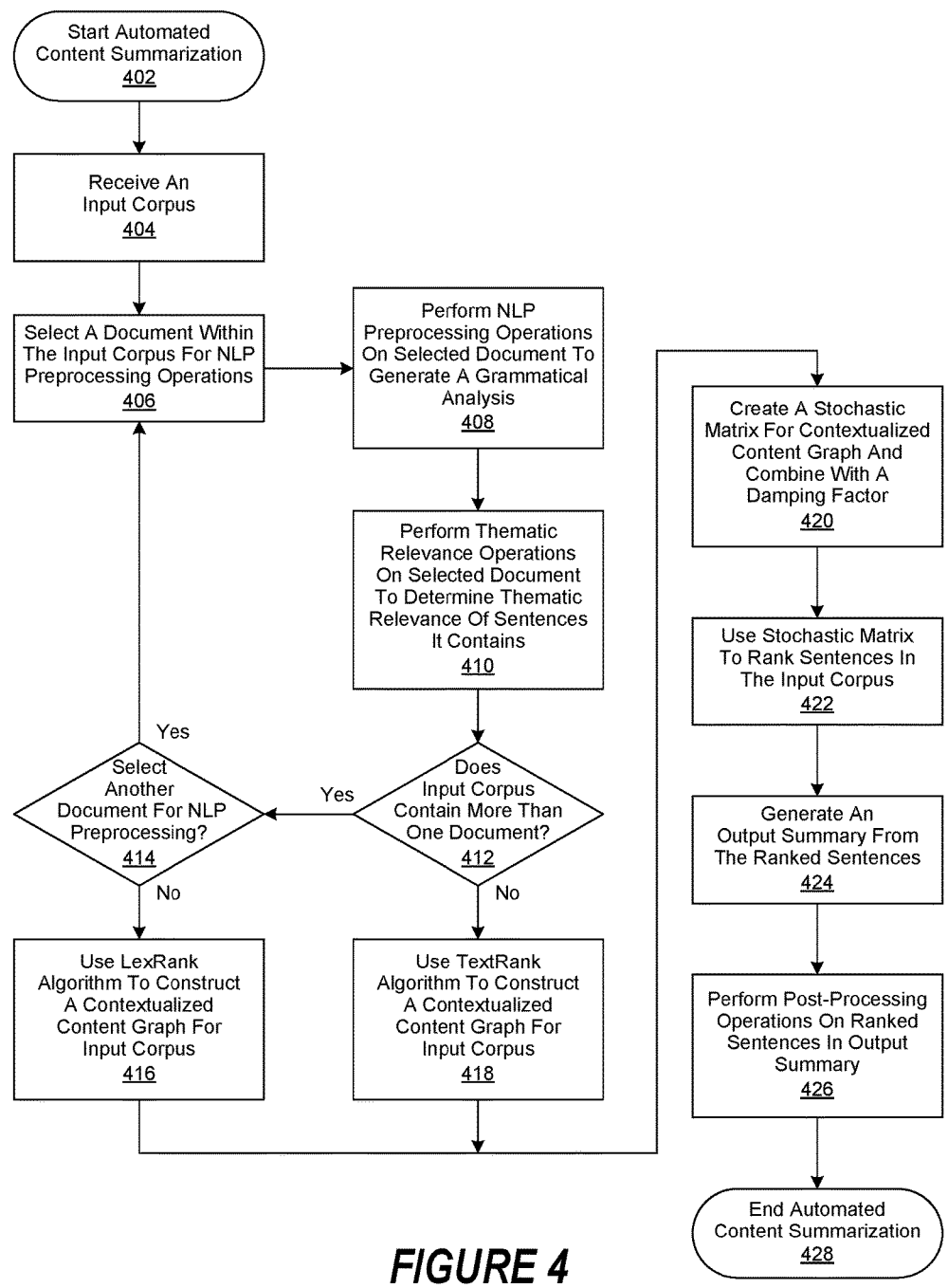
FIG. 4 is a flowchart of the performance of automated summarization operations.

FIG. 4 is a flowchart of automated summarization operations performed in accordance with an embodiment of the invention. In this embodiment, automated content summarization operations are begun in step 402, followed by the receipt of an input corpus in step 404. A document within the input corpus is then selected in step 406 for the performance of natural language processing (NLP) preprocessing operations. In one embodiment, the input corpus contains a single document. In this embodiment, only the single document is selected. In another embodiment, the input corpus contains multiple documents associated with a common subject. In this embodiment, an individual document is selected for the performance of NLP preprocessing operations. The method by which the individual document is selected is a matter of design choice.

A series of NLP preprocessing operations familiar to those of skill in the art are performed on text within the selected document in step 408 to generate meaningful tokenized words, also referred to as tokens. In various embodiments, the resulting tokens are then used as input for further processing such as parsing or text mining. In certain embodiments, the performance of such tokenization operations provides clarity to certain grammatical aspects of words within the input corpus. A series of thematic relevance operations are then performed in step 410 on the selected document to determine the thematic relevance of the individual sentences it contains.

A determination is then made in step 412 whether the input corpus contains more than one document. If so, then a determination is made in step 414 whether to select another document for NLP preprocessing. If so, then the process is continued, proceeding with step 406. Otherwise the LexRank algorithm is used in step 416 to construct a contextualized content graph, as described in greater detail herein, for the input corpus. However, if it was determined in step 412 that the input corpus does not contain more than one document, then the TextRank algorithm is used in step 418 to construct a contextualized content graph, as likewise described in greater detail herein, for the input corpus.

A stochastic matrix, also known as a Markov matrix, is then created in step 420 for the contextual content graph constructed in either step 416 or 418, and then combined with a damping factor, described in greater detail herein. In various embodiments, the stochastic matrix is implemented to determine the order in which individual sentences within the corpus of content are ranked. In these embodiments, the sentences are ranked in step 422 by determining the eigenvector of their associated vertices in the contextual content graph constructed in either step 416 or 418, which are represented by phrases corresponding to eigenvalue 1. As a result, individual sentences in the input corpus are ranked on the basis of thematic scoring, or contextual relevance.

An output summary is then generated in step 424 by combining the top ranking sentences, using a threshold or length cutoff to limit the size of the summary. The method by which the threshold or length cutoff is determined is a matter of design choice. Heuristic post-processing operations, described in greater detail herein, are then performed in step 426 on the ranked sentences within the output summary to discard sentences that are too similar to those already present. Automated content summarization operations are then ended in step 428.

Although the present invention has been described in detail, it should be understood that various changes, substitutions and alterations can be made hereto without departing from the spirit and scope of the invention as defined by the appended claims.

What is claimed is:

1. A computer-implemented method for using a contextual graph to summarize a corpus of content via an automated summarization system executing on a hardware processor of an information processing system, the method comprising:
   receiving an input corpus to the automated summarization system from an input corpus source via a network;

applying, via the automated summarization system, natural language processing (NLP) to the input corpus to form a grammatical analysis;
using, via the automated summarization system, the grammatical analysis to generate semantic associations between phrases in the input corpus,
using, via the automated summarization system, the semantic associations to determine the thematic relevance of sentences in the input corpus to form a context-based ranking;
using the context-based ranking to construct a context graph for the phrases; and
using the context graph to generate a content summarization of the input corpus;
ranking sentences based on the context-based ranking to form a sentencing ordering; and,
creating a stochastic matrix against vertices in the context graph to determine a ranking of the sentences.

2. The method of claim 1, wherein the context graph uses:
nodes to represent the phrases; and
edges to represent aggregated scores based on a calculation of structural and semantic similarity of the phrases.

3. The method of claim 1, further comprising:
identifying at least one theme of the input corpus; and
using contextual phrasal vectors between the phrases, ranked by the at least one theme to determine the context-based ranking.

4. The method of claim 3, further comprising:
identifying concepts and topics referenced in the phrases to determine a thematic relevance of sentences in the input corpus.

5. The method of claim 1, further comprising:
the ranking comprises performing a text ranking operation, the text ranking operation exploiting a source text structure to identify key phrases.

6. The method of claim 1, further comprising:
combining the stochastic matrix with a damping factor to determine an order in which individual sentences within the input corpus are ranked.

7. A system comprising:
a hardware processor;
a data bus coupled to the processor; and
a computer-usable medium embodying computer program code, the computer-usable medium being coupled to the data bus, the computer program code used for using a contextual graph to summarize a corpus of content via an automated summarization system executing on the hardware processor of the system and comprising instructions executable by the processor and configured for:
receiving an input corpus to the automated summarization system from an input corpus source via a network;
applying, via the automated summarization system, natural language processing (NLP) to the input corpus to form a grammatical analysis;
using, via the automated summarization system, the grammatical analysis to generate semantic associations between phrases in the input corpus,
using, via the automated summarization system, the semantic associations to determine the thematic relevance of sentences in the input corpus to form a context-based ranking;
using, via the automated summarization system, the context-based ranking to construct a context graph for the phrases; and
using the context graph to generate a content summarization of the input corpus;
ranking sentences based on the context-based ranking to form a sentencing ordering; and,
creating a stochastic matrix against vertices in the context graph to determine the ranking of the sentences.

8. The system of claim 7, wherein the context graph uses:
nodes to represent the phrases; and
edges to represent aggregated scores based on a calculation of structural and semantic similarity of the phrases.

9. The system of claim 7, further comprising:
identifying at least one theme of the input corpus; and
using contextual phrasal vectors between the phrases, ranked by the at least one theme to determine the context-based ranking.

10. The system of claim 7, further comprising:
identifying concepts and topics referenced in the phrases to determine the thematic relevance of sentences in the input corpus.

11. The system of claim 9, further comprising:
the ranking comprises performing a text ranking operation, the text ranking operation exploiting a source text structure to identify key phrases.

12. The system of claim 7, further comprising:
combining the stochastic matrix with a damping factor to determine an order in which individual sentences within the input corpus are ranked.

13. A non-transitory, computer-readable storage medium embodying computer program code for using a contextual graph to summarize a corpus of content via an automated summarization system executing on a hardware processor of an information processing system, the computer program code comprising computer executable instructions configured for:
receiving an input corpus to the automated summarization system from an input corpus source via a network;
applying, via the automated summarization system, natural language processing (NLP) to the input corpus to form a grammatical analysis;
using, via the automated summarization system, the grammatical analysis to generate semantic associations between phrases in the input corpus,
using, via the automated summarization system, the semantic associations to determine the thematic relevance of sentences in the input corpus to form a context-based ranking;
using, via the automated summarization system, the context-based ranking to construct a context graph for the phrases; and
using the context graph to generate a content summarization of the input corpus;
ranking sentences based on the context-based ranking to form a sentencing ordering; and,
creating a stochastic matrix against vertices in the context graph to determine the ranking of the sentences.

14. The non-transitory, computer-readable storage medium of claim 13, wherein the context graph uses:
nodes to represent the phrases; and
edges to represent aggregated scores based on a calculation of structural and semantic similarity of the phrases.

15. The non-transitory, computer-readable storage medium of claim 13, further comprising:
identifying at least one theme of the input corpus; and
using contextual phrasal vectors between the phrases, ranked by the at least one theme to determine the context-based ranking.

16. The non-transitory, computer-readable storage medium of claim 13, further comprising:
identifying concepts and topics referenced in the phrases to determine the thematic relevance of sentences in the input corpus.

17. The non-transitory, computer-readable storage medium of claim 13, further comprising:
the ranking comprises performing a text ranking operation, the text ranking operation exploiting a source text structure to identify key phrases.

18. The non-transitory, computer-readable storage medium of claim 13, further comprising:
combining the stochastic matrix with a damping factor to determine an order in which individual sentences within the input corpus are ranked.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

\* \* \* \* \*